Figure 1:
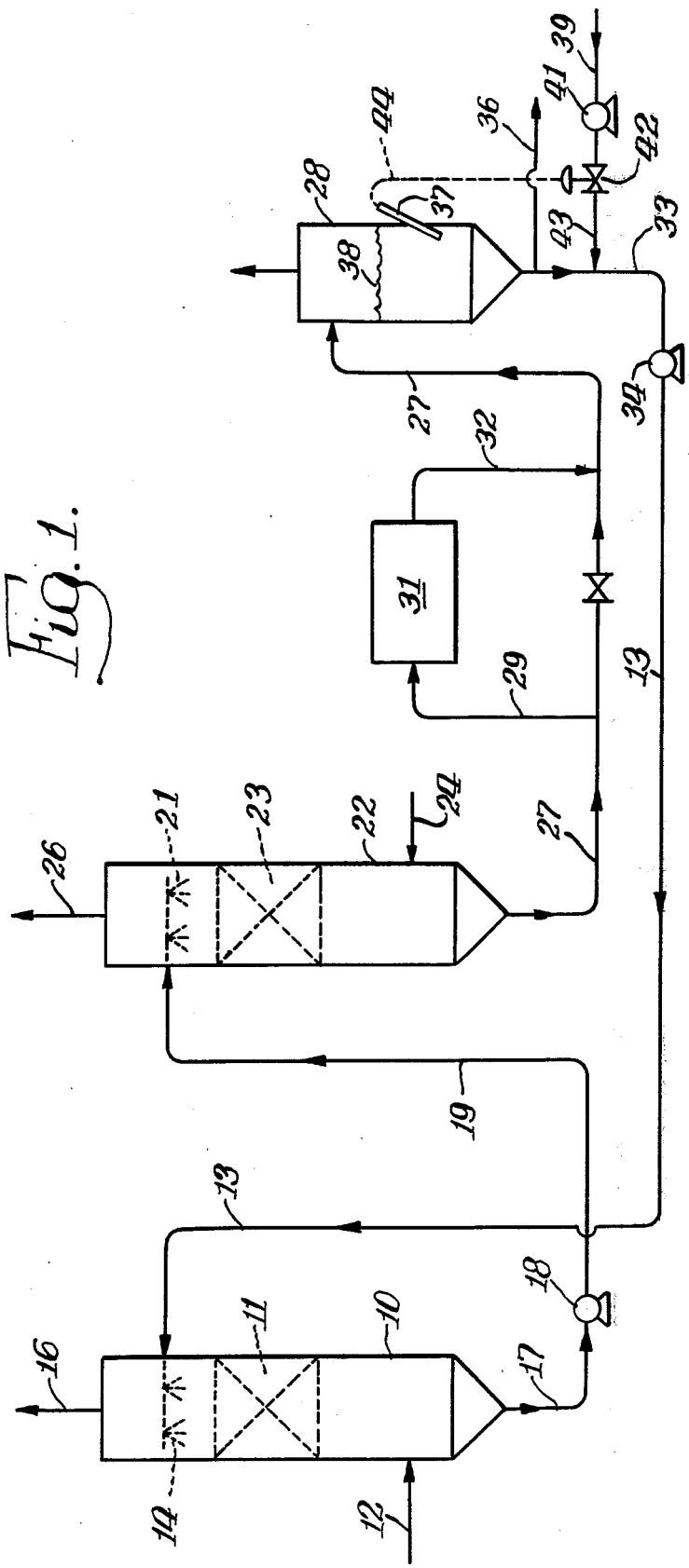

United States Patent [19]

Mancini et al.

[11] 4,011,304

[45] Mar. 8, 1977

[54] METHOD FOR CONTROLLING REMOVAL OF HYDROGEN SULFIDE FROM GASES

[75] Inventors: Robert A. Mancini, Elk Grove Village; David M. Cyr, Lombard, both of Ill.

[73] Assignee: Air Resources, Inc., Palatine, Ill.

[22] Filed: Mar. 5, 1975

[21] Appl. No.: 555,570

[52] U.S. Cl. .......................... 423/573 G; 423/224; 423/226

[51] Int. Cl.² ........................................ C01B 17/04

[58] Field of Search .......... 423/573, 571, 224, 226, 423/228

[56] References Cited

UNITED STATES PATENTS

| | | | |
|---|---|---|---|
| 2,969,276 | 1/1961 | Hirschberg | 423/480 |
| 3,097,925 | 7/1963 | Pitts et al. | 423/573 |

FOREIGN PATENTS OR APPLICATIONS

| | | |
|---|---|---|
| 999,800 | 7/1965 | United Kingdom |
| 999,799 | 7/1965 | United Kingdom |

OTHER PUBLICATIONS

"Instruction Manual, Platinum Vedox Electrode" Orion Research Corp., 1969, pp. 1–9.
Smith, R. L., *The Sequestration of Metals*, Chapman & Hall, Ltd., London, 1959, pp. 161–162.

*Primary Examiner*—G. O. Peters
*Attorney, Agent, or Firm*—Hibben, Noyes & Bicknell, Ltd.

[57] ABSTRACT

Hydrogen sulfide is removed from a gas stream in an oxidation-reduction system by contacting the gas stream with an aqueous chelated iron solution in which the iron is in the ferric state to absorb hydrogen sulfide and convert it to elemental sulfur. The solution is regenerated by aeration. A redox electrode is used to monitor the oxidation potential of the solution, and corrective action is taken, as required, to maintain the concentration of ferric iron in the solution so as to achieve efficient removal of hydrogen sulfide.

9 Claims, 2 Drawing Figures

METHOD FOR CONTROLLING REMOVAL OF HYDROGEN SULFIDE FROM GASES

This invention relates to a novel and improved method and apparatus for controlling the operation of an oxidation-reduction type process for the removal of hydrogen sulfide from gases and the recovery of sulfur. More particularly, the invention relates to a novel and improved control means in a process for the removal of hydrogen sulfide and from gas streams by using a reagent comprising an iron-chelate complex wherein the iron in its ferric state oxidizes the hydrogen sulfide to elemental sulfur and is concomitantly reduced to the ferrous state and wherein the reagent is regenerated by oxidation of the iron to the ferric state.

It is known to effect removal of hydrogen sulfide from a gas stream in an oxidation-reduction system by contacting the gas stream with a solution of a polyvalent metal cation (such as iron) complexed with a chelating agent (such as ethylene diamine tetra-acetic acid or a sodium salt thereof). Iron in the ferric state oxidizes the hydrogen sulfide and is reduced to the ferrous state, the solution being regenerated by oxidation to convert the iron back to the ferric state. For example, processes using a chelated iron reagent are disclosed in the following U.S. patents:

| Inventor | Patent No. | Date |
| --- | --- | --- |
| Hartley et al | 3,068,065 | Dec. 11, 1962 |
| Pitts et al | 3,097,925 | July 16, 1963 |
| Meuly et al | 3,226,320 | Dec. 28, 1965 |
| Roberts et al | 3,622,273 | Nov. 23, 1971 |
| Roberts et al | 3,676,356 | July 11, 1972 |

In addition, the above-listed Roberts et al patents refer to Czechoslovakian Nos. 117,273, 117,274 and 117,277 as also disclosing the use of chelated iron solutions for this purpose.

A serious problem in the use of a chelated iron solution arises from the inherent instability of the solution, particularly at higher pH levels, resulting in the precipitation of iron either as ferric hydroxide or ferrous sulfide. As disclosed in U.S. application Ser. No. 551,279, filed Feb. 20, 1975 by Ralph B. Thompson, which application is assigned to the same assignee as the present application, these problems are overcome by using an aqueous alkaline solution of iron and two different types of chelating agents, one of which is selected to bind ferrous ions strongly enough to prevent precipitation of ferrous sulfide, and the other of which is selected to bind ferric ions strongly enough to prevent precipitation of ferric hydroxide.

In an oxidation-reduction system of the aforementioned type it is necessary to maintain the oxidizing character of the solution in order to avoid loss of efficiency of hydrogen sulfide removal. Heretofore, the activity or viability of the solution has been evaluated qualitatively by periodic analyses of the hydrogen sulfide content of the treated gas or by observation of the color of the solution. It is known that the solution changes from a normal red-brown or tan color to green or black when ferrous sulfide is formed. However, neither of these inexact methods of evaluating the effectiveness of the solution is entirely satisfactory for continuous operation since in most instances corrective action is not taken until after the solution has deteriorated to the point of diminished efficiency of removal of hydrogen sulfide.

Accordingly, a primary object of the present invention is to provide a novel and improved control means in an oxidation-reduction system for removing hydrogen sulfide from gas streams.

A further object of the invention is to provide a novel and improved control means in a process using a chelated iron solution for removing hydrogen sulfide from gas streams.

Another object of the invention is to provide a novel and improved means for continuously monitoring and maintaining the redox potential of a chelated iron solution used in the removal of hydrogen sulfide from gas streams.

Figure 2:
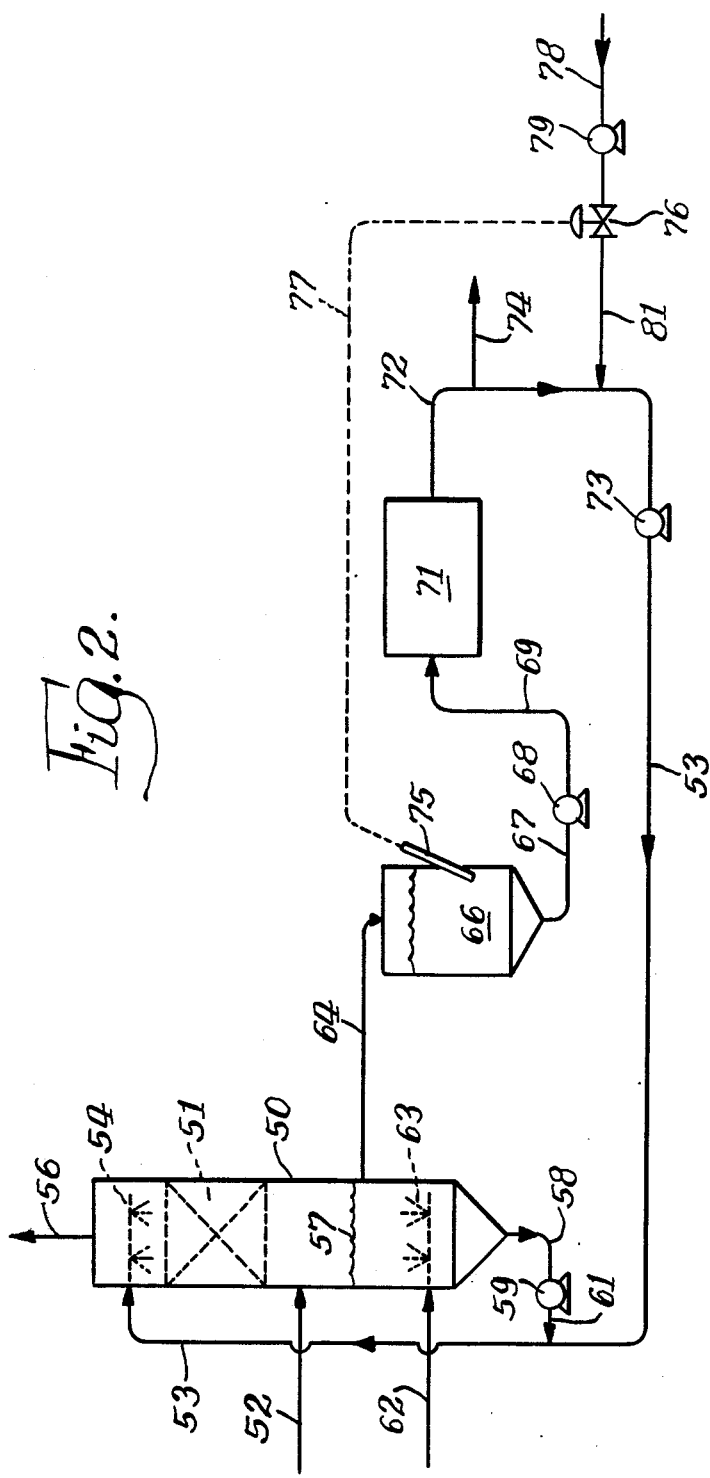

Other objects and advantages of the invention will become apparent from the subsequent detailed description in conjunction with the accompanying drawings, wherein:

FIG. 1 is a schematic process flow diagram showing one embodiment of the invention wherein oxidation of hydrogen sulfide and regeneration of the solution are carried out in separate reaction zones; and FIG. 2 is a schematic process flow diagram showing another embodiment of the invention wherein oxidation of hydrogen sulfide and regeneration of the solution are effected concurrently in the same reaction zone.

In a hydrogen sulfide removal process using a chelated iron solution, the hydrogen sulfide-containing gas stream is contacted or scrubbed with the chelated iron solution in which the iron is in the ferric state to effect oxidation of the hydrogen sulfide to elemental sulfur with concomitant reduction of the iron from the higher valence or ferric state to the lower valence or ferrous state. The solution is regenerated, in the same reaction zone or in a separate reaction zone, by aeration or the like to oxidize the iron to the ferric state.

The chemistry of the oxidation-reduction system is represented by the following equations:

(1) $H_2S\ (g) \longleftrightarrow H_2S\ (aq.)$
(2) $H_2S\ (aq.) + OH^- \longleftrightarrow HS^- + H_2O$
(3) $HS^- + OH^- \longleftrightarrow S^{-2} + H_2O$
(4) $2Fe^{+3} + S^{-2} \rightarrow 2Fe^{+2} + S°$
(5) $2Fe^{+2} + \frac{1}{2}O_2 + H_2O \rightarrow 2Fe^{+3} + 2OH^-$

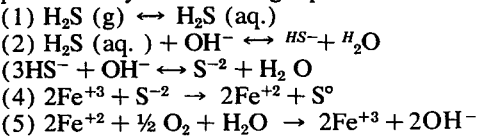

However, since the iron in the system is present in two different valence states there are also competing side reactions which can occur, resulting in loss of iron and rendering the solution ineffective for removal of hydrogen sulfide:

(A) $Fe^{+2} + S^{-2} \rightarrow FeS\downarrow$
(B) $Fe^{+3} + 3(OH)^- \rightarrow Fe(OH)_3\downarrow$

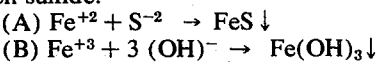

Although the process can be operated over a wide range of pH, it is preferred to maintain the pH of the solution at from about 7 to about 13, with the optimum range being from about 8 to about 10.5.

In order to maintain an acceptable efficiency of removal of hydrogen sulfide from the gas being treated, e.g. at least about 85%, it is necessary to maintain the redox potential of the chelated iron solution by avoiding the precipitation of ferrous sulfide. Effective and complete aeration of the solution to regenerate the same is, therefore, very important in order to maintain the activity of the solution. If ferrous ions begin to accumulate in the solution, deactivation is initiated, and if the use of the solution in its over-reduced state is continued, the iron soon precipitates out of solution as ferrous sulfide.

As previously pointed out, qualitative observation of the solution's color or measurement of the extent of removal of hydrogen sulfide from the outlet gas do not permit corrective action to be taken until after the solution has already begun to deteriorate. Furthermore, such observations do not afford a basis for continuous monitoring of the solution in a simple and inexpensive manner.

In accordance with the present invention, a redox electrode is used to measure the oxidizing or reducing capability of the chelated iron solution relative to a reference potential. Based on the millivolt reading given by the redox electrode, the working status of the solution can be evaluated instantly and continuously, and appropriate corrective action can be taken either on an intermittent basis or by automatic control means responsive to the redox electrode measurement. Furthermore it has been found that the redox electrode potential provides a reliable preliminary indication that the solution is losing its optimum effectiveness even though it is still removing hydrogen sulfide at a high level of efficiency. Thus, corrective action can be initiated before the operation of the system suffers.

Although the oxidation-reduction system is not in full equilibrium since sulfide ion is being converted to sulfur, nevertheless, it has been determined that the concentration of iron in the solution is so much greater than that of sulfide ions that the observed potential at the redox electrode accurately reflects the $Fe^{+2}/Fe^{+3}$ ratio. The redox electrode potentials for the oxidation and reduction half reactions $(Fe.Chel)^{+2} \rightarrow (Fe.Chel)^{+3} + e^-$
$(Fe.Chel)^{+3} + e^- \rightarrow (Fe.Chel)^{+2}$ are represented by the equations

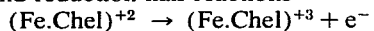
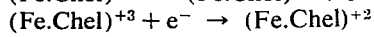

$$E = E_o - 0.059 \log \frac{[Fe.Chel^{+3}]}{[Fe.Chel^{+2}]}$$

$$E = E_o - 0.059 \log \frac{[Fe.Chel^{+2}]}{[Fe.Chel^{+3}]}$$

where
 E = the oxidation potential (in volts)
 $E_o$ = the standard oxidation potential, i.e. relative to the standard hydrogen electrode (in volts)

By measuring the potential of the chelated iron solution with a redox electrode and using the above equations, it is possible to estimate the ratio of $Fe^{+2}$ to $Fe^{+3}$ and thus obtain an accurate evaluation of the oxidizing ability or "health" of the solution.

Extensive experimental monitoring of chelated iron solutions in hydrogen sulfide removal processes has verified that the viability of the working solution can be estimated with accuracy at all times using a platinum redox electrode. For solutions having the same reagent concentrations the redox electrode readings have been found to be completely reproducible, and the color changes of the solution always occur at the same millivolt readings. Thus, it is possible to evaluate the working status of the solution and take corrective measures before the solution deteriorates to any significant extent.

For any given chelated iron solution, dependent particularly on the choice of chelating agent and the iron concentration, a predetermined range of redox electrode potential can readily be determined which corresponds to a "healthy" solution having effective oxidizing ability for removing hydrogen sulfide at acceptable efficiency, e.g. 85% removal or better. When the redox electrode reading departs from the predetermined norm, corrective action should be taken to increase the concentration of ferric iron in the solution. Theoretically, this can be done (1) by adding fresh ferric iron to the system, (2) by increasing the solution oxidation or regeneration in the system, or (3) by increasing the volume of solution in the system relative to the flow rate or hydrogen sulfide into the system. However, as a practical matter it is usually desirable to operate the system with a substantially constant volume of solution and with the maximum rate of aeration of the solution. Control of the concentration of ferric iron will, therefore, be accomplished in the usual situation by periodic actions of fresh chelated iron solution in which the iron is in or is oxidized to the ferric state, thereby increasing the ratio of ferric ions to ferrous ions and consequently increasing the redox potential of the solution. Corresponding withdrawal of used solution will also be made as required to maintain a substantially constant volume of solution in the system.

Although the control means of the present invention may be used with any chelated iron solution which is operable for removing hydrogen sulfide, the invention has been found to be particularly useful with a solution containing two different types of chelating agents selected for their ability to complex ferrous and ferric ions, respectively. As more fully described in the aforementioned Ralph B. Thompson Application Serial No. 551,279 which is incorporated herein by reference, the first or Type A chelating agent preferably comprises (either singly or as a mixture) the polyamino polycarboxylic acids, the polyamino hydroxyethyl polycarboxylic acids, or the polyphosphonomethylamines, the latter being phosphorus analogs of the polyamino polycarboxylic acids. Usually the aforementioned types of chelating agents will be used in the form of their alkali metal salts, particularly the sodium salts. The polyamino polyacetic acids and the polyamino hydroxyethyl polyacetic acids, or their sodium salts, are particularly desirable. The second or Type B chelating agent, preferably comprises the sugars, the reduced sugars, or the sugar acids. Examples of suitable sugars are the disaccharides, such as sucrose, lactose, and maltose, and the monosaccharides, such as glucose and fructose. Examples of suitable sugar acids are gluconic acid and glucoheptanoic acid, and these will usually be used in the form of their alkali metal salts, particularly the sodium salts. The reduced sugars, however, are preferred for the Type B chelating agent since there is no possibility of hydrolysis or oxidation at a potential aldehyde group. Examples of suitable reduced sugars are sorbitol and mannitol.

Excellent results have been obtained using a mixture of the sodium salts of ethylene diamine tetra-acetic acid and N-hydroxyethyl ethylene diamine triacetic acid as the Type A chelating agent and using sorbitol as the Type B chelating agent. Aqueous solutions of the aforementioned Type A chelating agents are available commercially from the Dow Chemical Co. under the trademark "Versene 100" ($Na_4EDTA$) and "Versenol 120" ($Na_3HEDTA$). The use of this mixture of Type A chelating agent is particularly advantageous since it insures the desired iron complexing effect not only in the optimum pH range of from about 8 to about 10.5 but also at pH levels above and below this range.

The aforementioned chelated iron solution is prepared by dissolving a suitable iron salt in water and adding the required amounts of the Type A and Type B chelating agents. To this solution the alkaline material is then added to provide a concentrate which can be diluted with water as required to obtain the operating solution having the desired pH and iron content. The iron content of the solution may vary over a wide range, dependent upon the gas being treated and other factors. Solutions having an iron content of from about 200 ppm to about 5000 ppm by weight are preferred. In preparing the concentrate it is desirable always to add the chelating agents before the alkaline agent so as to avoid precipitation of iron. However, the presence of the two types of chelating agents improves the stability of the solution so that no great care is required in making up the solution to prevent precipitation of iron hydroxide.

For economy, the amounts of the respective chelating agents need be no greater than required to complex the amount of iron present in either valence state, and in general lesser amounts can be used. In particular, it is desirable, for ease of regeneration, that the molar ratio of Type A chelating agent to iron be not greater than 2:1 and preferably from about 1:1 to about 1.5:1. The iron salt is preferably a ferric salt such as ferric chloride, ferric sulfate, or ferric nitrate. However, it is also possible to use a ferrous salt such as ferrous sulfate, but in this case the solution must be aerated prior to use in order to insure oxidation of the chelated iron to the ferric state. The alkaline material is preferably sodium carbonate or sodium hydroxide or mixtures thereof, although other compatible alkaline compounds may be used.

The process flow for an oxidation-reduction system using a chelated iron solution and the control means of the present invention will depend upon the hydrogen sulfide content of the gas stream being treated and the nature of the other components of the gas stream. FIG. 1 illustrates a process flow in which the oxidation of hydrogen sulfide and the regeneration of the chelated iron solution are carried out in separate reaction zones, this arrangement being referred to as anaerobic operation. However, the redox electrode technique may also be used in an aerobic operation in which the oxidation of hydrogen sulfide and regeneration of the chelated iron solution are carried out concurrently in the same zone.

Referring to FIG. 1, the reaction system comprises an absorption tower or scrubber 10 containing a contact zone illustrated schematically at 11. This zone may comprise any suitable liquid-vapor contacting means such as the conventional packed beds, plates or trays. The inlet gas containing hydrogen sulfide is introduced into the tower 10 through a line 12 below the contact zone 11 for passage upwardly therethrough. In particular, the inlet gas for an anaerobic operation may be a gas stream containing hydrocarbons and a relatively high concentration of hydrogen sulfide, e.g. a sour natural gas containing 1-5% hydrogen sulfide. The chelated iron solution is supplied by a line 13 to sprays or distribution nozzles 14 located in the upper portion of the tower 10 and passes downwardly through the contact zone 11 in countercurrent relation to the upwardly flowing gas stream. The treated gas exits from the tower 10 through an outlet 16. The chelated iron solution is continuously withdrawn from the bottom of the tower 10 through a line 17 and is supplied by a pump 18 and a line 19 to sprays or nozzles 21 disposed in the upper portion of a regeneration tower 22 above a contact zone 23. Air is supplied through a line 24 to the lower portion of the tower 22 and passes upwardly through the zone 23 in countercurrent contact with the used solution thereby aerating the latter to oxidize the ferrous iron to ferric iron. The effluent air exits from the tower 22 through an outlet 26.

In the tower 10 the hydrogen sulfide in the inlet gas is oxidized to elemental sulfur by the chelated iron solution, as heretofore described, and sulfur solids are therefore present as a slurry in the used solution. This slurry is continuously withdrawn from the bottom of the regeneration tower 22 through a line 27 to a reservoir or tank 28. All or a portion of the sulfur slurry is diverted through a line 29 to a filter 31 where sulfur is removed. The filtrate is withdrawn from the filter 31 through a line 32 and is supplied by the line 27 to the reservoir 28. Regenerated solution is withdrawn from the bottom of the reservoir 28 through a line 33 by a pump 34 and is recirculated through line 13 to the absorption tower 10. A portion of the solution may be bled from the system through a line 36, as desired.

A platinum redox electrode 37, such as the Orion Model 96-78 available commercially from Orion Research Incorporated, Cambridge, Massachusetts, is mounted in the wall of the reservoir 28 below the level of the solution indicated at 38. Since the electrode contains a filling solution (e.g. saturated aqueous potassium chloride and silver chloride), the electrode is mounted either vertically or at a slight angle from the vertical. Fresh chelated iron solution is supplied by an inlet line 39 to a pump 41 and is passed through a control valve 42 and a line 43 to the line 33. As indicated schematically by the broken line 44, the operation of the valve 42 is responsive, through a suitable control means (not shown), to the potential of the solution as measured by the electrode 37. Thus, if the redox potential of the regenerated solution does not fall within the predetermined range for a "healthy" solution, as required by the setting of the control means, fresh solution of chelated iron will be metered automatically into the system until the desired redox potential is restored. The withdrawal of used solution through the line 36 may also be accomplished automatically, if desired, in response to the redox electrode reading and in coordination with the introduction of fresh solution to the system.

FIG. 2 illustrates a process flow in which the oxidation of hydrogen sulfide and the regeneration of the chelated iron solution are carried out concurrently in the same reaction zone, this arrangement being referred to as aerobic absorption processing or aerobic operation. The process flow of FIG. 2 is particularly adapted for use in treating a waste gas stream containing a relatively low concentration of hydrogen sulfide (e.g. 50-100 ppm or less) and which is free of hydrocarbons or other materials which should not be mixed with air or oxygen.

Referring to FIG. 2, the reaction system comprises an absorption tower or scrubber 50 containing a contact zone illustrated schematically at 51. The inlet gas containing hydrogen sulfide is introduced into the tower 50 through a line 52 below the contact zone 51 for passage upwardly therethrough. Typically, the inlet gas has a low hydrogen sulfide content on the order of 50 ppm and is free of hydrocarbons, e.g. the off-gas from a xanthate plant producing rayon or cellophane, or from a sewage plant. The chelated iron solution is supplied by a line 53 to sprays or distribution nozzles 54 located in the upper part of the tower 50 and passes downwardly through the contact zone 51 in countercurrent relation to the upwardly flowing gas stream. The treated gas exits from the tower 50 through an outlet 56.

In the arrangement illustrated in FIG. 2 the bottom portion of the absorption tower 50 is used as a reservoir for the chelated iron solution which fills the bottom of the tower to a level, indicated at 57, below the point of introduction of gas through the line 52. The chelated iron solution is continuously recirculated from the bottom of the tower 50 to the nozzles 54 through a line 58, a pump 59, and a line 61 connected to the line 53.

For regeneration of the chelated iron solution, atmospheric air is supplied through a line 62 to nozzles 63 disposed in the lower portion of the tower 50 so that the air is bubbled through the volume of solution in the bottom of the tower, thereby thoroughly aerating the solution to oxidize the ferrous iron to ferric iron. The effluent air passes upwardly through the tower 50 along with the feed gas and exits with the treated gas through the outlet 56.

In the contact zone 51 the hydrogen sulfide in the inlet gas is oxidized to elemental sulfur by the chelated iron solution, as heretofore described, and the sulfur solids are present as a slurry in the treating solution in the bottom of the tower. A portion of this slurry, usually in the form of a froth, is continuously withdrawn from the tower 50 through a line 64 to a slurry tank 66. The sulfur slurry is withdrawn from the bottom of the slurry tank 66 though a line 67 by a pump 68 and is supplied through a line 69 to a filtration step 71. Filtrate is withdrawn from the filter 71 through a line 72 by a pump 73 and is recirculated through line 53 to the absorption tower 50. A portion of the filtrate may be bled from the system through a line 74, as desired. As in the FIG. 1 system, a platinum redox electrode 75 is mounted in the wall of the vessel 66 to measure the redox potential of the solution. The electrode reading may be used to control a valve 76, as indicated by the line 77, which meters the supply of fresh solution introduced through a line 78, a pump 79, and a line 81.

The following example will serve to illustrate the invention but it is not to be construed as limiting the invention:

EXAMPLE

A chelated iron concentrate was prepared using $Na_4EDTA$ and $Na_3HEDTA$ as the Type A chelating agents and using sorbitol as the Type B chelating agent. The composition of the concentrate was as follows:

|  | Grams |
| --- | --- |
| Water | 2400 |
| $FeCl_3$ (39 wt. % aqueous solution) | 577 |
| $Na_4EDTA$ | 272 |
| $Na_4EDTA$ | 272 |
| $Na_3HEDTA$ (41 wt. % aqueous solution) | 272 |
| Sorbitol (70 wt. % aqueous solution) | 272 |
| NaOH (50 wt. % aqueous solution) | 153 |
| $Na_2CO_3$ | 350 |

This concentrate was diluted with sufficient water to provide an operating solution having an iron content of 5000 ppm (by weight).

The operating solution was used to scrub varying mixtures of hydrogen sulfide and air in aerobic operation. An Orion Model 96–78 platinum redox electrode was used to monitor the solution, and the millivolt readings were adjusted in accordance with standard procedure to provide potentials relative to the normal hydrogen electrode. The adjusted redox electrode reading for the fresh or unused solution was + 270 millivolts.

Hydrogen sulfide and air were bubbled into the scrubbing solution at rates of 2 cc/min and 200 cc/min, respectively. The solution reached equilibrium at a redox electrode reading of approximately + 140 millivolts (adjusted basis). The solution maintained 100% scrubbing efficiency throughout the duration of the run.

Hydrogen sulfide and air were bubbled into the scrubbing solution at rates of 3 cc/min and 200 cc/min, respectively. The solution reached a steady state at a redox electrode reading of approximately + 90 millivolts (adjusted basis). The solution maintained 100% scrubbing efficiency throughout the duration of the run.

Hydrogen sulfide and air were bubbled into the scrubbing solution at rates of 5 cc/min and 200 cc/min, respectively. The solution began to take on a greenish color at a redox electrode reading of −170 millivolts (adjusted basis) and turned black at −200 millivolts (adjusted basis). 100% scrubbing efficiency was maintained until the potential dropped to −280 millivolts (adjusted basis). The solution was completely regenerated by raising the air rate.

These results were checked by further experimentation. It was found that the color changes always occured at the same millivolt readings for solutions having the same reagent concentrations.

For chelated iron solutions having from about 200 to about 5000 ppm of iron by weight it has been found that the redox electrode potential (adjusted basis) should not be less than from about −215 to about −250 millivolts, respectively, in order to maintain a hydrogen sulfide removal efficiency of 85% or better when processing a gas containing up to about 7% hydrogen sulfide.

We claim:

1. In a process for the removal of hydrogen sulfide from a gas in an oxidation-reduction system by contacting the gas with a chelated iron solution comprising an aqueous solution of iron complexed with at least one chelating agent, whereby iron in the ferric state oxidizes the hydrogen sulfide to elemental sulfur and is reduced to the ferrous state, separating sulfur from said solution, and regenerating said solution by aeration to oxidize the iron to the ferric state; the improved method of regulating the redox potential of the solution in the system to obtain a hydrogen sulfide removal efficiency of at least about 85%, which comprises:
   a. effecting addition for fresh chelated iron solution to the system and withdrawal of used solution from the system so as to increase the ratio of ferric ions to ferrous ions and thereby increase the redox potential of the solution in the system;
   b. maintaining a substantially constant volume of solution in the system;
   c. maintaining substantially the maximum rate of aeration of the solution;
   d. measuring the redox potential of the solution in the system by means of a redox electrode; and e. controlling said addition of fresh solution and said withdrawal of used solution to maintain said redox potential of the solution in the system at not less than a predetermined minimum required to maintain the activity of the solution.

2. The process of claim 1 further characterized in that said solution contains (A) at least one chelating agent capable of binding iron in the ferrous state to prevent precipitation of ferrous sulfide and (B) at least one chelating agent capable of binding iron in the ferric state to prevent precipitation of ferric hydroxide.

3. The process of claim 2 further characterized in that said first-named chelating agent (A) is selected from the group consisting of the polyamino polycarboxylic acids and their alkali metal salts, the polyamino hydroxyethyl polycarboxylic acids and their alkali metal salts, the polyphosphonomethyl amines and their alkali metal salts, and mixtures of the foregoing, and said second-named chelating agent (B) is selected from the group consisting of sugars, reduced sugars, and sugar acids and their alkali metal salts.

4. The process of claim 2 further characterized in that said first-named chelating agent (A) is selected from the group consisting of the polyamino polyacetic acids and their alkali metal salts, the polyamino hydroxyethyl polyacetic acids and their alkali metal salts and mixtures of the foregoing, and said second-named chelating agent (B) is a reduced sugar selected from the group consisting of sorbitol and mannitol.

5. The process of claim 2 further characterized in that said first-named chelating agent comprises a mixture of the sodium salts of ethylene diamine tetra-acetic acid and N-hydroxyethyl ethylene diamine triacetic acid, and said second-named chelating agent comprises sorbitol.

6. The process of claim 5 further characterized in that said solution contains sufficient alkaline material selected from the group consisting of sodium hydroxide, sodium carbonate, and mixtures thereof to provide a solution pH of from about 8 to about 10.5.

7. The process of claim 5 further characterized in that said solution has a molar ratio of said first-named chelating agent to iron in said solution of not greater than 2:1.

8. The process of claim 5 further characterized in that said solution has an iron content of from about 200 to about 5000 ppm by weight, and said redox potential relative to the normal hydrogen electrode, as measured by a platinum redox electrode, is maintained at not less than from about −215 to about −250 millivolts.

9. The process of claim 5 further characterized in that:
said solution has an iron content of from about 200 to about 5000 ppm by weight, a pH of from about 8 to about 10.5, and a molar ratio of said first-named chelating agent to iron of from about 1:1 to about 1.5:1, and
said redox potential relative to the normal hydrogen electrode, as measured by a platinum redox electrode, is maintained at not less than from about −215 to about −250 millivolts.

* * * * *

UNITED STATES PATENT AND TRADEMARK OFFICE
CERTIFICATE OF CORRECTION

PATENT NO. : 4,011,304
DATED : March 8, 1977
INVENTOR(S) : Robert A. Mancini et al It is certified that error appears in the above-identified patent and that said Letters Patent are hereby corrected as shown below:

Column 1, line 11, "sulfide and from" should read --sulfide from--.

Column 2, lines 42 and 43, the equations should appear as follows:

--(2) $H_2S$ (aq.) + $OH^-$  $HS^-$ + $H_2O$ (3) $HS^-$ + $OH^-$ 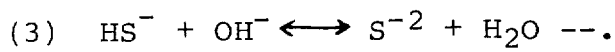 $S^{-2}$ + $H_2O$ --.

Column 4, line 10, "rate or" should read --rate of--;

line 16, "actions" should read --additions--.

Column 7, in the table at line 60, the fourth line ($Na_4EDTA$ .... 272") should be deleted since it is a repetition of the third line.

UNITED STATES PATENT OFFICE
CERTIFICATE OF CORRECTION

Patent No. 4,011,304            Dated March 8, 1977

Inventor(s) Robert A. Mancini et al.

It is certified that error appears in the above-identified patent and that said Letters Patent are hereby corrected as shown below:

Column 8, line 58, "for" should read -- of --.

Signed and Sealed this

Thirty-first Day of May 1977

[SEAL]

Attest:

RUTH C. MASON
*Attesting Officer*

C. MARSHALL DANN
*Commissioner of Patents and Trademarks*